(12) United States Patent
Green et al.

(10) Patent No.: US 12,725,416 B2
(45) Date of Patent: Sep. 1, 2026

(54) METHOD, APPARATUS AND COMPUTER PROGRAM FOR GENERATING SPORTS GAME HIGHLIGHT VIDEO BASED ON WINNING PROBABILITY

(71) Applicants: Sony Group Corporation, Tokyo (JP); Sony Europe B.V., Surrey (GB)

(72) Inventors: Samuel Green, Basingstoke (GB); Raymond Tang, Basingstoke (GB)

(73) Assignees: SONY EUROPE BV, Surrey (GB); SONY GROUP CORPORATION, Tokyo (JP)

( * ) Notice: Subject to any disclaimer, the term of this patent is extended or adjusted under 35 U.S.C. 154(b) by 367 days.

(21) Appl. No.: 18/107,939

(22) Filed: Feb. 9, 2023

(65) Prior Publication Data

US 2023/0267736 A1 Aug. 24, 2023

(30) Foreign Application Priority Data

Feb. 23, 2022 (GB) ...................................... 2202465

(51) Int. Cl.
*G06V 20/40* (2022.01)
*G06T 7/70* (2017.01)

(52) U.S. Cl.
CPC ................ *G06V 20/42* (2022.01); *G06T 7/70* (2017.01); *G06V 20/47* (2022.01); *G06T 2207/10016* (2013.01); *G06T 2207/30224* (2013.01)

(58) Field of Classification Search
CPC .......... G06V 20/42; G06V 20/47; G06T 7/70; G06T 2207/10016; G06T 2207/30224;
(Continued)

(56) References Cited

U.S. PATENT DOCUMENTS 6,072,504 A * 6/2000 Segen ..................... G06T 17/00 345/474
10,417,500 B2 * 9/2019 Ray ....................... G06V 20/47
(Continued)

OTHER PUBLICATIONS

X. Wei, P. Lucey, S. Morgan and S. Sridharan, "Forecasting the Next Shot Location in Tennis Using Fine-Grained Spatiotemporal Tracking Data," in IEEE Transactions on Knowledge and Data Engineering, vol. 28, No. 11, pp. 2988-2997, Nov. 1, 2016, doi: 10.1109/TKDE.2016.2594787 (Year: 2016).*
(Continued)

*Primary Examiner* — Matthew C Bella
*Assistant Examiner* — Janice E. Vaz
(74) *Attorney, Agent, or Firm* — Tucker Ellis LLP

(57) ABSTRACT

A method for generating a sports game highlight video based on winning probability includes receiving video of the sports game from at least one image capture device; performing object tracking analysis on the video to generate tracking data providing ball trajectory and player position information; identifying a shot event in the video of the sports game based on said tracking data; extracting video segments of the identified shot events from the video of the sports game; generating shot event metadata for indexing the video segments; computing a winning probability matrix including winning probabilities at point level by winning probability model of the sports game, based on said shot event metadata; and generating a sports game highlight video based on said winning probability matrix.

17 Claims, 14 Drawing Sheets

(58) Field of Classification Search
CPC ....... H04N 21/23418; H04N 21/44008; H04N 21/8456; H04N 21/8549
See application file for complete search history.

(56) References Cited

U.S. PATENT DOCUMENTS

| | | | | |
|---|---|---|---|---|
| 2014/0274297 | A1 | 9/2014 | Lewis et al. | |
| 2014/0315610 | A1 | 10/2014 | Shachar | |
| 2017/0083769 | A1 | 3/2017 | Van Rensburg | |
| 2017/0157512 | A1 | 6/2017 | Long et al. | |
| 2017/0228600 | A1 | 8/2017 | Syed et al. | |
| 2018/0078862 | A1 | 3/2018 | Schleicher | |
| 2018/0108380 | A1 * | 4/2018 | Packard | H04N 21/2668 |
| 2021/0224950 | A1 | 7/2021 | Otterness et al. | |
| 2022/0047917 | A1 * | 2/2022 | Lunt | A63B 24/0062 |
| 2023/0072888 | A1 * | 3/2023 | Kim | G06F 16/7837 |
| 2023/0256318 | A1 * | 8/2023 | Seidl | G06N 7/01 700/91 |

OTHER PUBLICATIONS

Ghosh, Anurag; et al, "SmartTennisTV: Automatic indexing of tennis videos", arxiv.org, Cornell University Library, 201 Olin Library Cornell University Ithaca, NY 14853, Jan. 4, 2018 (Jan. 4, 2018), XP080850542.

Zhu, Guangyu; et al, "Player action recognition in broadcast tennis video with applications to semantic analysis of sports game", ACM Multimedia 2006 & Co-Located Workshops : Oct. 23-27, 2006, Santa Barbara, Califirnia, USA; MM'06; Proceedings, ACM Press, [New York, NY], Oct. 23, 2006 (Oct. 23, 2006), pp. 431-440, XP058233308.

Merler, Michele; et al, "Automatic Curation of Sports Highlights Using Multimodal Excitement Features", IEEE Transactions on Multimedia, IEEE, USA, vol. 21, No. 5, May 1, 2019 (May 1, 2019), pp. 1147-1160, XPOII 721188.

Montagna,Silvia; et al, "Bayesian isotonic logistic regression via constrained splines: an application to estimating the serve advantage in professional tennis", Statistical Methods & Applications, Springer Berlin Heidelberg, Berlin/Heidelberg, Jul. 8, 2020 pp. 573-604, XP037468496.

Polk, Tom; et al, "TenniVis: Visualization for Tennis Match Analysis", IEEE Transactions on Visualization and Computer Graphics, IEEE, USA, vol. 20, No. 12, Dec. 31, 2014 (Dec. 31, 2014), pp. 2339-2348, XP011563293.

Polk, Tom; et al, "CourtTime: Generating Actionable Insights into Tennis Matches Using Visual Analytics", IEEE Transactions on Visualization and Computer Graphics, IEEE, USA, vol. 26, No. 1, Jan. 1, 2020 (Jan. 1, 2020), pp. 397-406, XP011752632.

Search Report from corresponding GB Application No. 2202465.7, mailed on Aug. 19, 2022, 5 pages.

* cited by examiner

Player Historical Statistics

| | Player profile | | | | | General performance statistics | | | | Game performance statistics | | | | | | |
|---|---|---|---|---|---|---|---|---|---|---|---|---|---|---|---|---|
| Game | Player | Age | Current Rank | Best Rank | ... | Overall win rate | Win rate (hard) | Win rate (grass) | ... | Serve won percentage | Return won percentage | Average serve speed | Winners rate | Unforced error rate | Forced error rate | ... |
| A | X | 26 | ... | ... | ... | | | | ... | 65% | 48% | 220 | | | | ... |
| B | Y | 25 | ... | ... | ... | | | | ... | 56% | 51% | 213 | | | | ... |
| C | Z | 23 | ... | ... | ... | | | | ... | 61% | 55% | 209 | | | | ... |
| ... | ... | ... | ... | ... | ... | | | | ... | ... | ... | ... | | | | ... |

FIG. 4

Winning Probability Matrix

| Video segment serial no. | Player | Timestamp | Scoreboard | Shot winning probability | Point winning probability | Game winning probability | Set winning probability | Match winning probability | Tournament winning probability |
|---|---|---|---|---|---|---|---|---|---|
| 1 | A | 0:00:00 | 00-00 | 0.52 | 0.52 | 0.55 | 0.55 | 0.55 | 0.55 |
| 2 | B | 0:00:15 | 00-00 | 0.48 | 0.48 | 0.45 | 0.45 | 0.45 | 0.45 |
| 3 | A | 0:00:18 | 00-00 | 0.66 | 0.66 | 0.59 | 0.58 | 0.56 | 0.55 |
| 4 | B | 0:00:21 | 00-00 | 0.34 | 0.34 | 0.41 | 0.42 | 0.44 | 0.45 |
| 5 | A | 0:00:23 | 00-00 | 0.85 | 0.85 | 0.63 | 0.61 | 0.58 | 0.55 |
| 6 | A | 0:00:40 | 15-00 | 0.54 | 0.54 | 0.69 | 0.65 | 0.61 | 0.58 |
| 7 | A | 0:01:06 | 30-00 | 0.55 | 0.55 | 0.80 | 0.75 | 0.68 | 0.60 |
| 8 | B | 0:01:18 | 30-00 | 0.45 | 0.45 | 0.20 | 0.25 | 0.32 | 0.40 |
| ... | ... | ... | ... | ... | ... | ... | ... | ... | ... |

FIG. 5

Point Excitement Matrix

| Video segment serial no. | Player | Timestamp | Scoreboard | Set-Match Excitement Score | Player Strengths Excitement Score | Shot Variety Excitement Score | Rally Length Excitement Score | ... | Average Unreturnability Excitement |
|---|---|---|---|---|---|---|---|---|---|
| 1 | A | 0:00:00 | 00-00 | 0.2 | 0.54 | 0.52 | 0.10 | ... | 0.55 |
| 2 | B | 0:00:15 | 00-00 | 0.2 | 0.54 | 0.61 | 0.15 | ... | 0.55 |
| 3 | A | 0:00:18 | 00-00 | 0.2 | 0.54 | 0.47 | 0.20 | ... | 0.55 |
| 4 | B | 0:00:21 | 00-00 | 0.2 | 0.54 | 0.43 | 0.25 | ... | 0.55 |
| 5 | A | 0:00:23 | 00-00 | 0.2 | 0.54 | 0.78 | 0.30 | ... | 0.55 |
| 6 | A | 0:00:40 | 15-00 | 0.2 | 0.54 | 0.66 | 0.10 | ... | 0.65 |
| 7 | A | 0:01:06 | 30-00 | 0.2 | 0.54 | 0.54 | 0.10 | ... | 0.49 |
| 8 | B | 0:01:18 | 30-00 | 0.2 | 0.54 | 0.59 | 0.15 | ... | 0.49 |
| ... | ... | ... | ... | ... | ... | ... | ... | ... | ... |

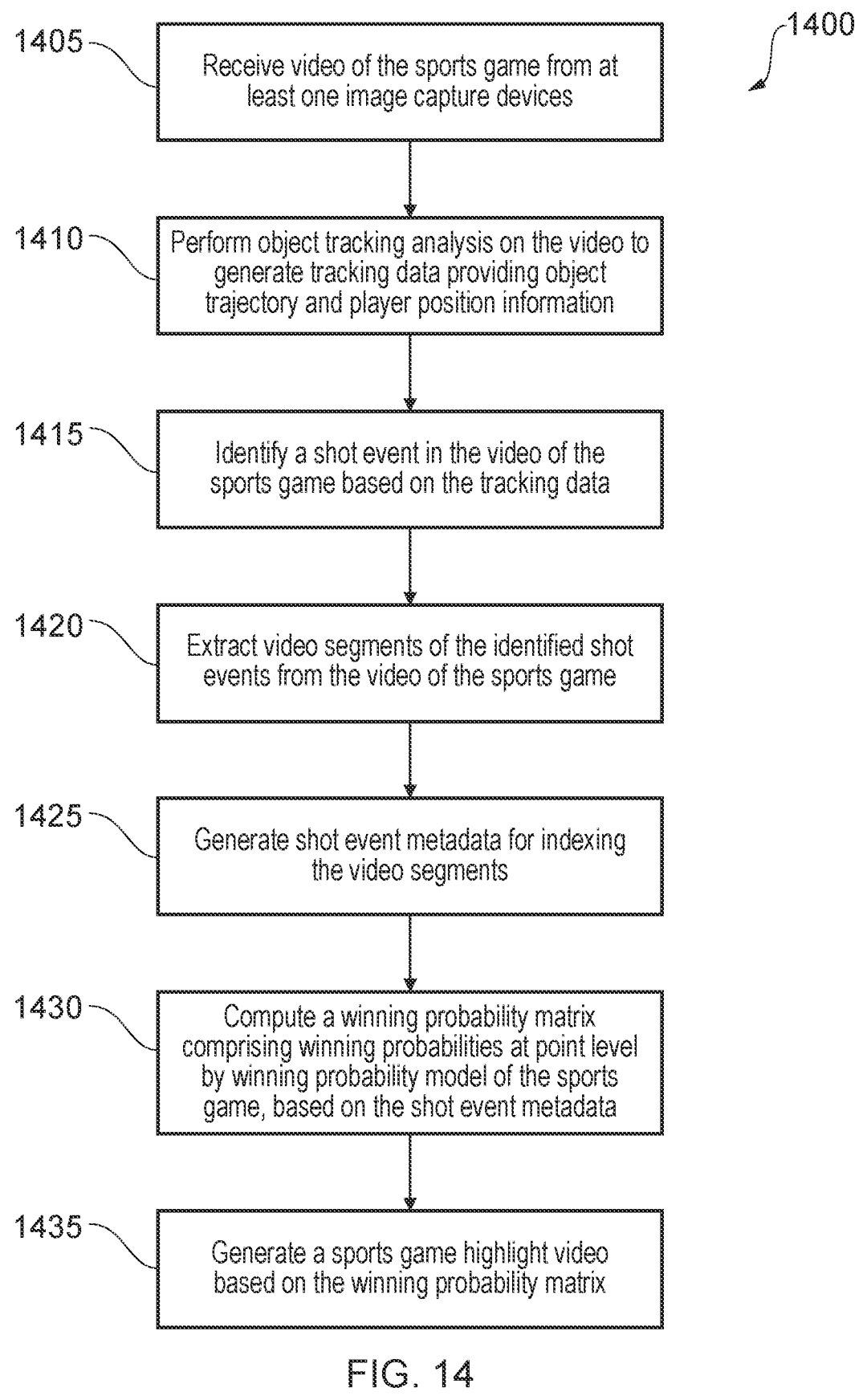

1405 Receive video of the sports game from at least one image capture devices

1410 Perform object tracking analysis on the video to generate tracking data providing object trajectory and player position information 1415 Identify a shot event in the video of the sports game based on the tracking data 1420 Extract video segments of the identified shot events from the video of the sports game 1425 Generate shot event metadata for indexing the video segments 1430 Compute a winning probability matrix comprising winning probabilities at point level by winning probability model of the sports game, based on the shot event metadata 1435 Generate a sports game highlight video based on the winning probability matrix

FIG. 14

METHOD, APPARATUS AND COMPUTER PROGRAM FOR GENERATING SPORTS GAME HIGHLIGHT VIDEO BASED ON WINNING PROBABILITY

RELATED APPLICATION DATA

This application claims the benefit of United Kingdom Patent Application No. 2202465.7, filed Feb. 23, 2022, the disclosure of which is incorporated herein by reference in its entirety.

Field of the Disclosure

The present technique relates to a method, apparatus and computer program for video processing of sports game recording.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

In a sports game tournament involving matches between multiple players, a vast amount of video recordings could result and it is often desirable for spectators to have a summary video of the tournament to highlight the best moments in each match, whether it is the longest rally in a game, a perfectly struck topspin lob ending a long deuce, the final shot of a five-time champion to defend his/her title, or a player coming back to triumph after losing the first two sets. In another scenario when two or more matches are in progress at the same time, a spectator watching a live broadcast of one of the matches may wish to glimpse any particularly exciting moments in other matches. It is therefore desirable for the live broadcast system to identify these exciting moments in real time.

The identification of the most exciting moments in the matches are performed manually by experienced commentators. However, this process is time consuming and inefficient, which cannot satisfy the needs of providing real-time highlight during the matches or immediate summary at the end of the matches.

It is an aim of embodiments of the present disclosure to at least address this issue.

SUMMARY

According to the disclosure, there is provided a method for generating a sports game highlight video based on winning probability, comprising the steps of: receiving video of the sports game from at least one image capture device; performing object tracking analysis on the video to generate tracking data providing ball trajectory and player position information; identifying a shot event in the video of the sports game based on said tracking data; extracting video segments of the identified shot events from the video of the sports game; generating shot event metadata for indexing the video segments; computing a winning probability matrix comprising winning probabilities at point level by winning probability model of the sports game, based on said shot event metadata; and generating a sports game highlight video based on said winning probability matrix.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 describes a database structure for the database in FIG. 1 which stores player historical statistics according to embodiments of the disclosure;

FIG. 5 describes an exemplary dataset of a winning probability matrix according to embodiments of the disclosure;

FIG. 11 describes an exemplary dataset of a point excitement matrix according to embodiments of the disclosure;

FIG. 14 shows a flow chart describing a process of generating sports game highlight video based on excitement of gameplay implemented by the video processing system according to embodiments of the disclosure.

DESCRIPTION OF THE EMBODIMENTS

Figure 1:
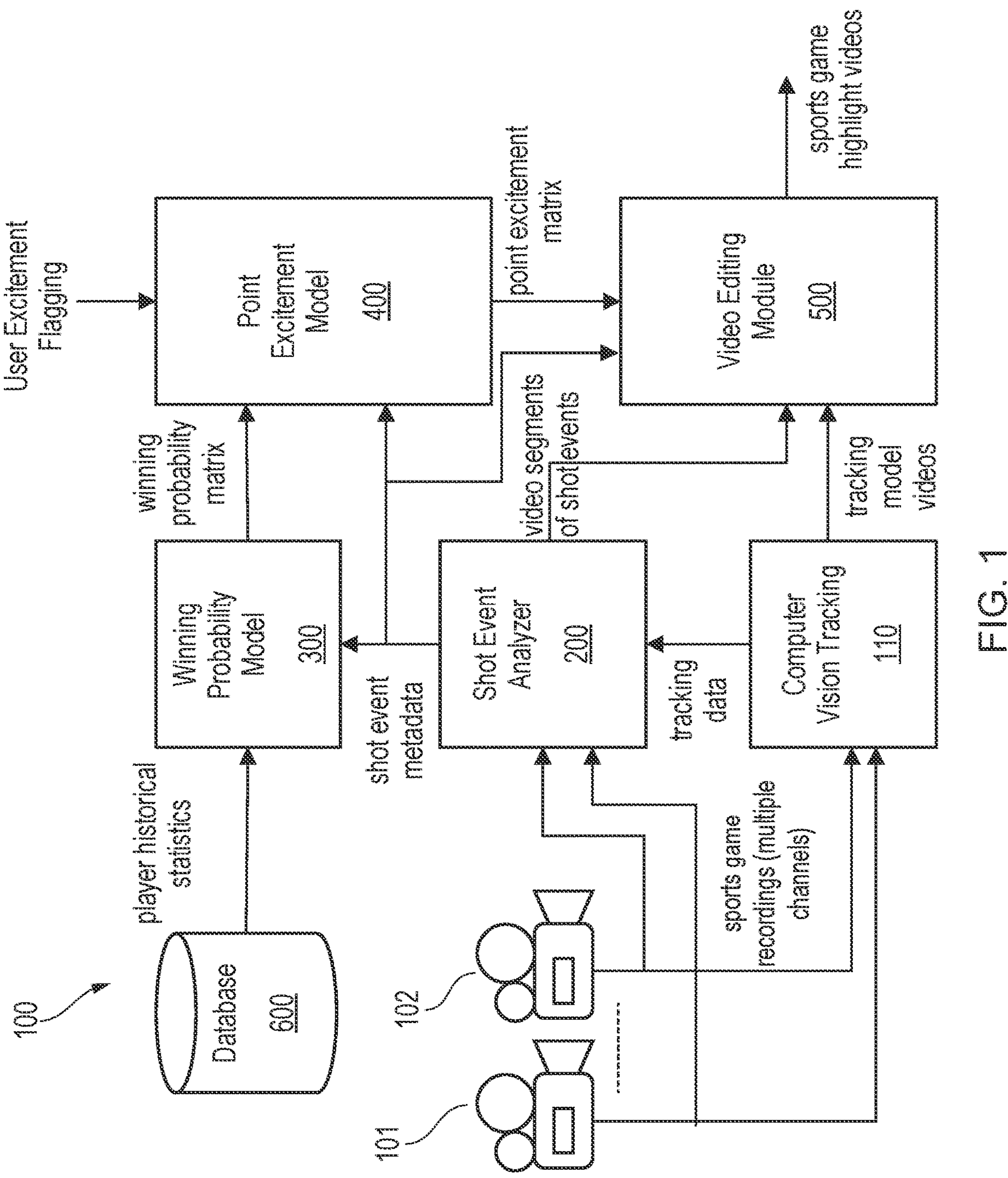
FIG. 1 describes a video processing system for generating sports game highlight video based on quality of gameplay according to embodiments of the disclosure.

Referring now to the drawings, wherein like reference numerals designate identical or corresponding parts throughout the several views.

The present disclosure provides a video processing system which generates sports game highlight videos based on a point excitement model which computes game excitement weights for tennis game elements (for example, the quality of a shot or a rally at a certain point level of the tournament in terms of point, game, set, and match). Each game excitement weigh represents how exciting a sports game is/was with respect to the corresponding game element. In some embodiments, the game excitement weighs with respect to various game elements may be averaged to obtain the overall excitement weight at a point level. In other sports games, such as squash or badminton, the game element will be different. The point excitement model may cover different levels of data so is applicable from lowest level games where only scoring is available up to games with full computer vision tracking in place. According to embodiments of the present disclosure, the video processing system may generate sports game highlight videos based on the point excitement model. In some embodiments, the video processing system may generate sports game highlight videos based on a winning probability model which predicts the winning probability at point level, game level, set level, match level, and tournament level.

According to embodiments of the present disclosure, the video processing system may generate sports game highlight videos based on a winning probability model which predicts the winning probability at point level, game level, set level, match level, and tournament level. The deviation of the actual outcome of a sports game from the predicted winning probability may represent how surprising and exciting the sports game is/was. Embodiments of the disclosure can be used live (e.g. to highlight the most exciting matches currently taking place in a tournament) or retrospectively (e.g. to auto-generate a most interesting short reel). Although embodiments of the disclosure are designed for generating sports game highlight videos for a tennis game, it is envisaged that the various concepts of shot, rally, point, game, point excitement, and winning probability described herein may be equally employed for other types of sports games such as badminton, table tennis, squash and volleyball.

FIG. 1 is a schematic block diagram illustrating a video processing system 100 for generating sports game highlight video based on quality of gameplay according to embodiments of the disclosure. The video processing system 100 may include a plurality of video cameras 101, 102, a computer vision tracking module 110, a shot event analyser 200, a database 600 for storing player historical statistics, a winning probability model 300, a point excitement model 400, and a video editing module 500. The video cameras 101, 102 may be arranged to record video image data and audio data in a game play from different angles of the court, including the players, the officials such as chair umpire and line umpires, the coaches, the spectators and the commentators. Although FIG. 1 shows only two video cameras, any number of video cameras is envisaged. The computer vision tracking module 110 performs position and movement tracking of the objects in the game court which may have an impact on the game scoring or reflect the performance of the players. In the example of tennis, the objects are in the court during the game such as the players and tennis ball, by performing image recognition of the objects in the video image data obtained from video cameras 101, 102. In other words, the computer vision tracking module 110 identifies the elements in the video and then tracks the position and movement of the identified objects through the video. In embodiments mathematical modelling may also be used to perform the tracking positions and movements. The computer vision tracking module 110 outputs tracking data to the shot event analyser 200 for identifying the shot events in the video of the sports game, which represent different stages of a shot. In the example of tennis, a shot may consist of a series of events, starting with the tennis ball being hit by a player, the tennis ball passing the net, the tennis ball landing on the court, and the tennis ball being hit by the opponent. The shot event analyser 200 further partitions the video of the sports game into video segments for individual shots, based on the identified shot events. The shot event analyser 200 will be described later with reference to FIG. 2.

The computer vision tracking module 110 also generates 3D tracking model videos from the tracking data to provide visual presentation of the tracking data, such as illustrating the trajectories of the object (e.g.: tennis ball) using the mathematical modelling. The 3D tracking model videos may be presented as an animation or an augmented reality video blending 3D objects into a real-life background. In the example of tennis, a 3D tracking model video illustrating a serve may include 3D objects representing the players and their positions, the players' foot positions, rackets, the tennis ball, the service box, the baseline, the tram lines and the net. The animation based on the 3D objects may illustrate the tennis ball trajectory including the landing position, the change of player positions as well as body posture in response to the tennis ball movement.

The winning probability model 300 estimates the winning probabilities with respect to different levels of a tournament such as a game, a set, and a match, based on the player historical statistics and shot event metadata respectively acquired from the database 600 and the shot event analyser 200, details of which will be described later with reference to FIG. 3. The winning probabilities may be calculated before or after the sports game, or in real-time during the game based on the game progress, and output to the video editing module 500 for generating sports game highlight videos. The database structure of database 600 will be described later with reference to FIG. 4.

The point excitement model 400 evaluates the point excitement matrix with respect to different elements of a sports game, based on the shot event metadata acquired from the shot event analyser 200, details of which will be described later with reference to FIG. 10. The point excitement matrix comprises game excitement weighs for game elements (for example, the quality of a shot or a rally at a certain point level of the tournament in terms of point, game, set, and match) that represents how exciting it is/was. The point excitement matrix may be calculated before or after a sports game, or in real-time during the sports game based on the game progress, and output to the video editing module 500 for generating sports game highlight videos.

The video editing module 500 filters and sorts the video segments of shot events obtained from the shot event analyser 200 based on the point excitement matrix and generates highlight videos to summarize the sports games. The video editing process can be performed according to user preference or a default setting, in regards of parameters such as video length, criteria of filtering and priority of sorting. Further details of the video editing module 500 will be described later with reference to FIG. 13.

Figure 2:
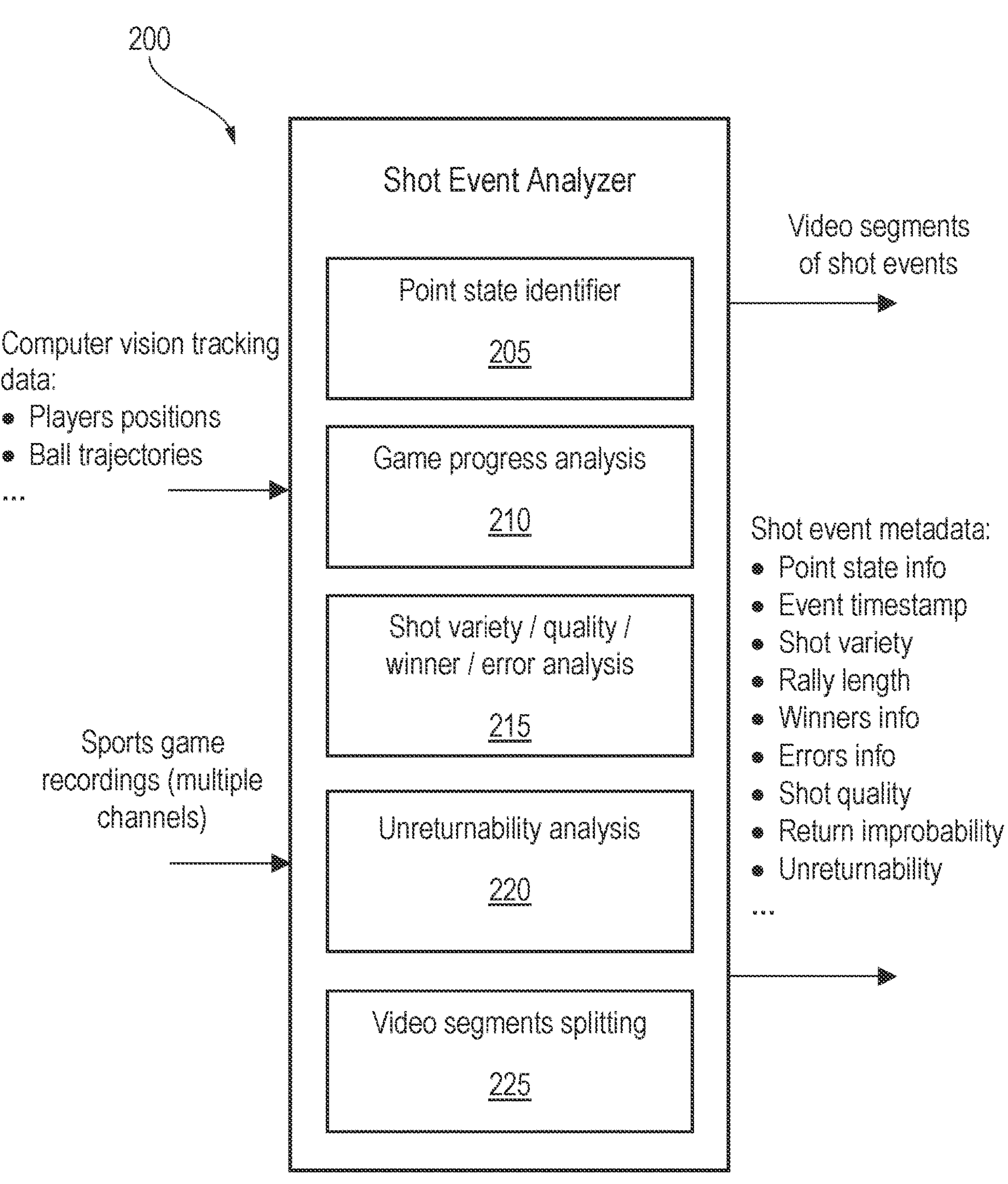
FIG. 2 describes the shot event analyser of FIG. 1 according to embodiments of the disclosure.

FIG. 2 is a schematic block diagram illustrating the shot event analyser 200 of FIG. 1 according to embodiments of the disclosure. The shot event analyser 200 includes a point state identifier 205, a game progress analysis module 210, a shot analysis model 215, an unreturnability analysis module 220, and a video segments splitting module 225. The shot event analyser 200 performs analyses of the tennis game recordings received from the video cameras 101, 102 based on the tracking data calculated by the computer vision tracking module 110. The shot event analyses include identifying the moments of point state changes in the recordings by the point state identifier 205. In some embodiments, the point state information may be obtained based on an input of metadata for the state of the game (for example, real-time score, scoring format, discipline) which comes from a scoring feed generated by a scoreboard controller. In some embodiments, the point state information may be obtained by analysing the image of the scoreboard in the video. The point state information allows exciting points to be identified and win probability to be calculated (e.g. the fifth set tiebreaker in a tennis match), and will be described in further detail later with reference to FIGS. 3 and 10. The shot event analyses also comprise tracking the game progress at the game progress analysis module 210 through determining the ending shots in a game, such as the winning shots and error shots, based on the tracking data and game rules. The game progress analysis module 210 also recognizes and clusters a series of shots in a rally and generates data of the rally such as rally length, measured by the number of shots in the rally or the absolute time taken by the rally. In the meantime, the shot analysis module 215 implements the indexing of each shot in a match in respect of shot variety, shot quality, winning shots and error shots, according to embodiments of the disclosure. Further analysis on the quality of a shot is performed by the unreturnability analysis module 220, which takes into account the difficulty for a player to return a particular shot. In some embodiments, the unreturnability of a shot indicates the likelihood that the opponent will not successfully return that particular shot, and may be calculated based on information including: position of receiver, trajectory of the shot, speed of the shot, forward or backward stroke, and historical data of receiver performance. The return improbability of the returning shot is also recorded based on the unreturnability of that particular shot provided that it is successfully returned by the player. Although embodiments of the disclosure are designed for performing shot analysis in relation to a tennis game, it is envisaged that the various concepts of winner shots, error shots, rally, shot variety, shot quality, unreturnability and return improbability described herein may be equally employed for other types of sports games such as badminton, table tennis, squash and volleyball.

The video segments splitting module 225 extracts the game parts of the sports game recordings and splits them into video segments based on the results of foregoing shot event analyses, namely, the shot event metadata. According to embodiments, the shot event metadata may include point state information, event timestamp, shot variety, rally length, winner (winning shots) information, errors information, shot quality, unreturnability and return improbability. Each of the video segments is indexed with corresponding shot event metadata.

Figure 3:
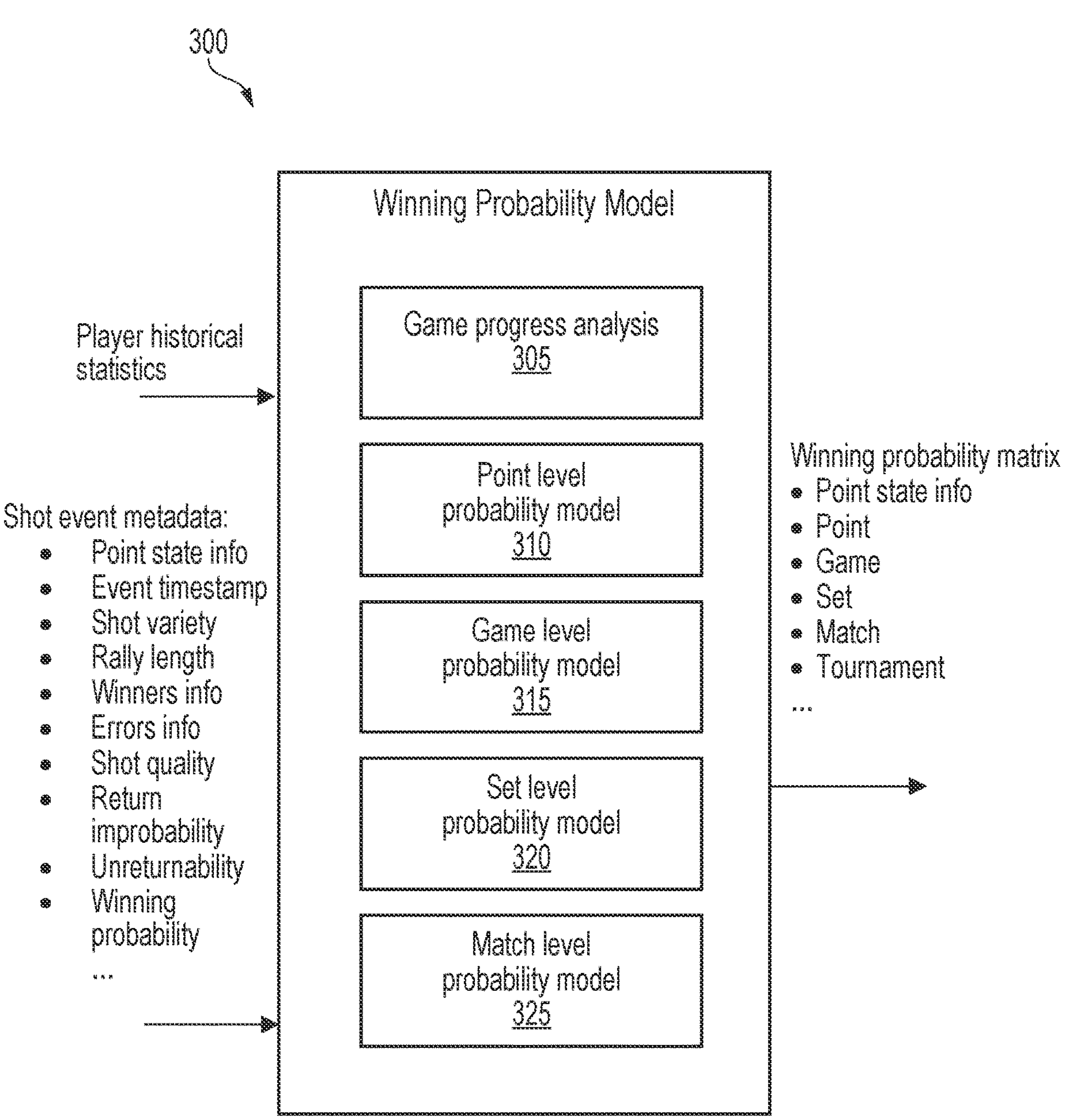
FIG. 3 describes the winning probability model of FIG. 1 according to embodiments of the disclosure.

FIG. 3 is a schematic block diagram illustrating the winning probability model 300 of FIG. 1 according to embodiments of the disclosure. The winning probability model 300 acquires player historical statistics and shot event metadata respectively from the database 600 and the shot event analyser 200, and predicts the winning probability matrix including winning probabilities with respect to a point, game, set, match and tournament. According to embodiments of the disclosure, the winning probability model 300 includes a game progress analysis module 305, a point level probability model 310, a game level probability model 315, a set level probability model 320, and a match level probability model 325.

According to embodiments of the disclosure, the game progress analysis module 305 keeps track of the game progress based on the shot event metadata and game rules, and generates the point state and game state for the corresponding video segment. For example, a video segment is identified as relevant to a rally when the scoreboard is 30-15 in the third game of the second set.

According to embodiments of the disclosure, the winning probability model 300 starts accessing the winning probability from viewing a sports game on a point by point level at the point level probability model 310. Once the winning probability for a point is calculated, the winning probability model 300 proceeds to evaluate the winning probability for a sports game that the point belongs to, based on the game level probability model 315. In some embodiments, the game level winning probability may be computed before or after the sports game, or in a real-time manner during the sports game, based on the progress of the sports game provided by the game progress analysis module 305 and the winning probability of the present point provided by the point level probability model 310.

The winning probability model 300 then evaluates the winning probability for a set based on the set level probability model 320 and the winning probabilities of the relevant sports games in the set calculated by the game level probability model 315. In some embodiments, the set level winning probability may be computed before or after the sports game, or in a real-time manner during the sports game, based on the progress of the sports game provided by the game progress analysis module 305 and the winning probability of the present game provided by the game level probability model 315.

Similarly, the winning probability model 300 evaluates the winning probability for a match based on the match level probability model 325 and the winning probabilities of the relevant sets in the match calculated by the set level probability model 320. In some embodiments, the match level winning probability may be computed before or after the sports game, or in a real-time manner during the sports game, based on the progress of the sports game provided by the game progress analysis module 305 and the winning probability of the present set provided by the set level probability model 320.

The point level probability model 310, game level probability model 315, set level probability model 320 and match level probability model 325 will be described in further detail later with reference to FIGS. 6-8.

FIG. 4 illustrates a database structure for database 600 in FIG. 1 which stores player historical statistics according to embodiments of the disclosure. As previously described, the player historical statistics may be used for calculating winning probabilities according to embodiments of the disclosure.

In embodiments, the database 600 stores player historical statistics includes profile of the player such as age, current rank, best rank, best season in his/her career. The player historical statistics may further include performance statistics of the player in previous tournaments or previous games in the present tournament. The performance statistics may contain overall win rate and specific win rate with respect to the surface type: hard, clay and grass; tournament level; the point state of a sports game, such as at a break point, a double fault, or a deuce; and various stress factors such as during a tie-break, or after losing a set. The performance statistics may additionally include breakdown of game statistics such as: serve won percentage, return won percentage, serve speeds, tie breaks won percentage, proportion of different types of shots/strokes and play styles, and the corresponding rate of winners, unforced errors and forced errors.

FIG. 5 illustrates an exemplary dataset of a winning probability matrix according to embodiments of the disclosure. As previously described, the winning probability matrix may be used as the basis for the video editing module 500 to generate sports game highlight videos.

In embodiments, the winning probability matrix includes video segment serial number, player information, timestamp of the corresponding video segments, scoreboard information, point level winning probability, game level winning probability, set level winning probability, match winning level probability and tournament level winning probability.

Figure 6:
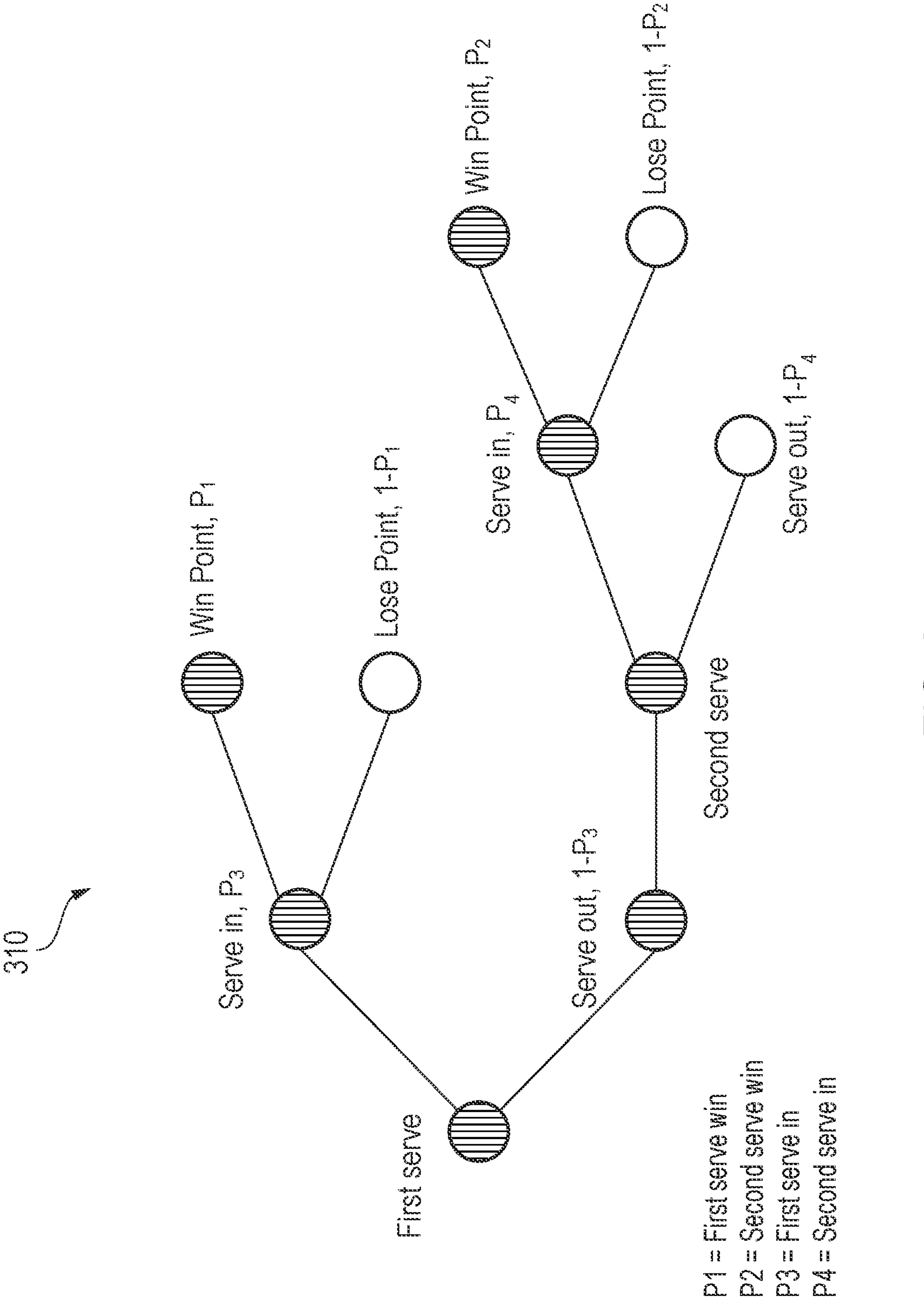
FIG. 6 describes the point level probability model in FIG. 3 according to embodiments of the disclosure.

FIG. 6 illustrates the point level probability model 310 in FIG. 3 according to embodiments of the disclosure. The point level probability model 310 is constructed based on the tennis game rules for scoring a point. For example, according to the game rules, after the player serves out, he or she is given a second chance to serve and he or she can still score one point if he or she wins the second serve. The point level winning probability is determined by the probabilities of winning a first or second serve given that the serve landed in. The paths of winning a game point are represented by the shaded nodes in FIG. 7, and the probability of winning a point is mathematically represented as:

$$P(\text{winning point}) = (P_3 \times P_1) + (1 - P_3) \times P_4 \times P_2$$

where $P_1$ is the probability of winning the first serve $P_2$ is the probability of winning the second serve $P_3$ is the probability of first serve in $P_4$ is the probability of second serve in The probability at each node (i.e.: $P_1$, $P_2$, $P_3$ and $P_4$) of the point level probability model 310 is calculated based on match differentials such as absolute strengths or relative strengths of the players in the sports game. The match differentials may be computed from the player historical statistics, such as past ace rates and winning point rates for the relevant surface type (hard, clay or grass) stored in database 600. In some embodiments, the probabilities for the same type of nodes may be taken as the same by the probability model 310, for example, the probability of serve in for a player may be taken as the same throughout the whole match. For a more accurate estimate of the probability, the probability may be adjusted or scaled based on the game state (progress of the sports game) and player historical statistics corresponding to that particular game state, since the game state may affect winning conditions such as the fatigue, stress, and hence the performance of the player.

Although FIG. 6 shows a point level probability model for a tennis game, the construction of point level probability models for other sports games, such as badminton, table tennis, squash and volleyball to determine winning probability is envisaged.

In some other embodiments, the probability values may be further adjusted to more accurately represent player levels and conditions for a given match. For example, if the player is playing against an opponent who has an above average success rate of winning a return point, the probability of first serve win will be marked down accordingly.

Figure 7:
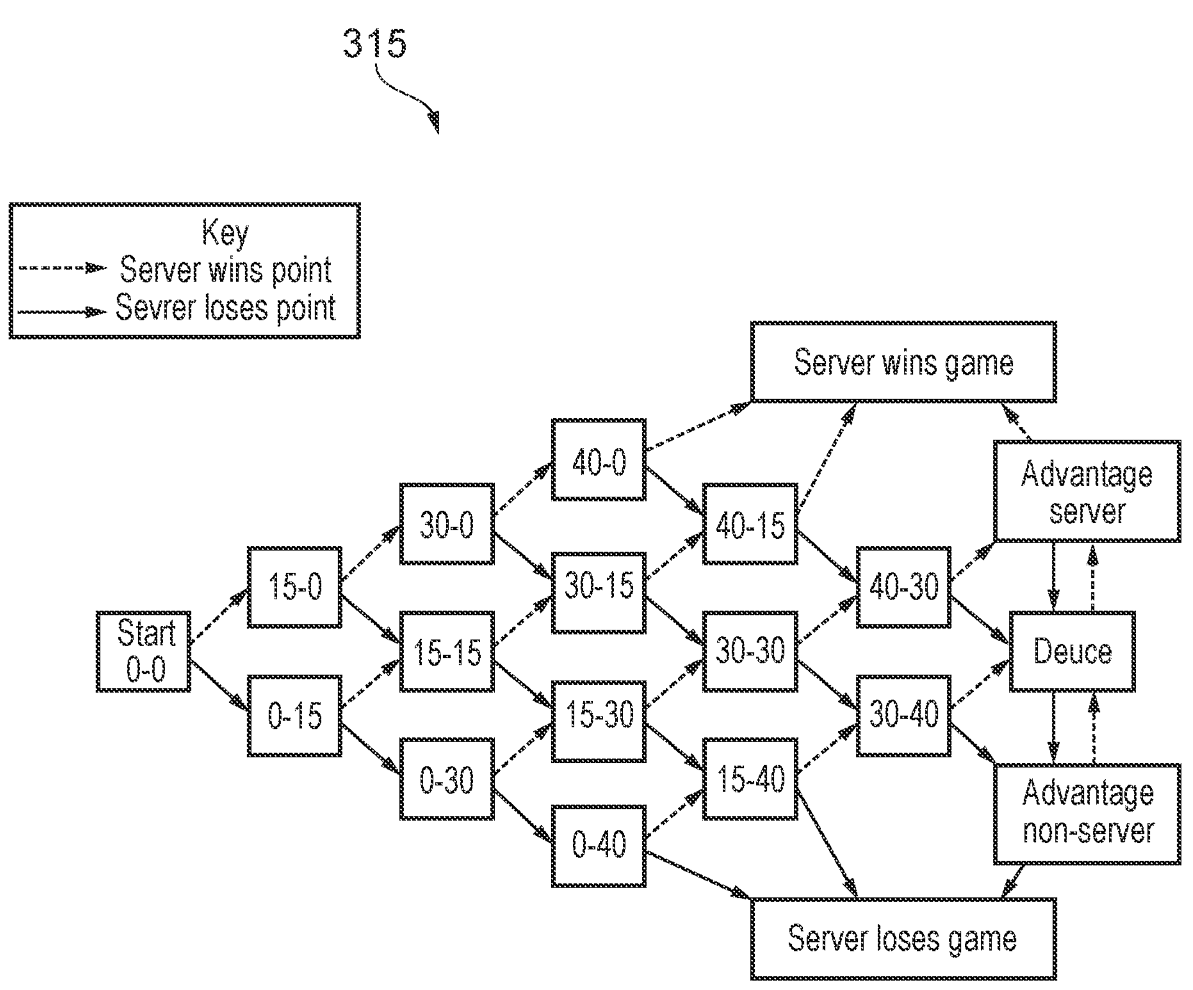
FIG. 7 describes the game level probability model in FIG. 3 according to embodiments of the disclosure.

FIG. 7 illustrates the game level probability model 315 in FIG. 3 according to embodiments of the disclosure. The game level probability model 315 is constructed based on the tennis game rules for scoring a game. The game level probability model 315 is further built upon the point level probability model 310 described above. Specifically, the probability calculated by the point level probability model 310 at each point level is adopted by the node in the game level probability model 315 corresponding to that point level.

The game level winning probability is determined by taking into account which player starts serving the game and the probability of winning the game can be chained to work out the probability of winning the point from the given point state. The probabilities for all scenarios to win are added up from current game state. For example, the probability of winning the game by 40-0 is mathematically represented as:

$$P(\text{winning a game by } 40\text{–}0) = P(\text{winning a point at } 0\text{–}0) \times P(\text{winning a point at } 15\text{–}0) \times P(\text{winning a point at } 30\text{–}0) \times P(\text{winning a point at } 40\text{–}0)$$

Although FIG. 7 shows a game level probability model for a tennis game, the construction of game level probability models for other sports games, such as badminton, table tennis, squash and volleyball to determine winning probability is envisaged.

Figure 8:
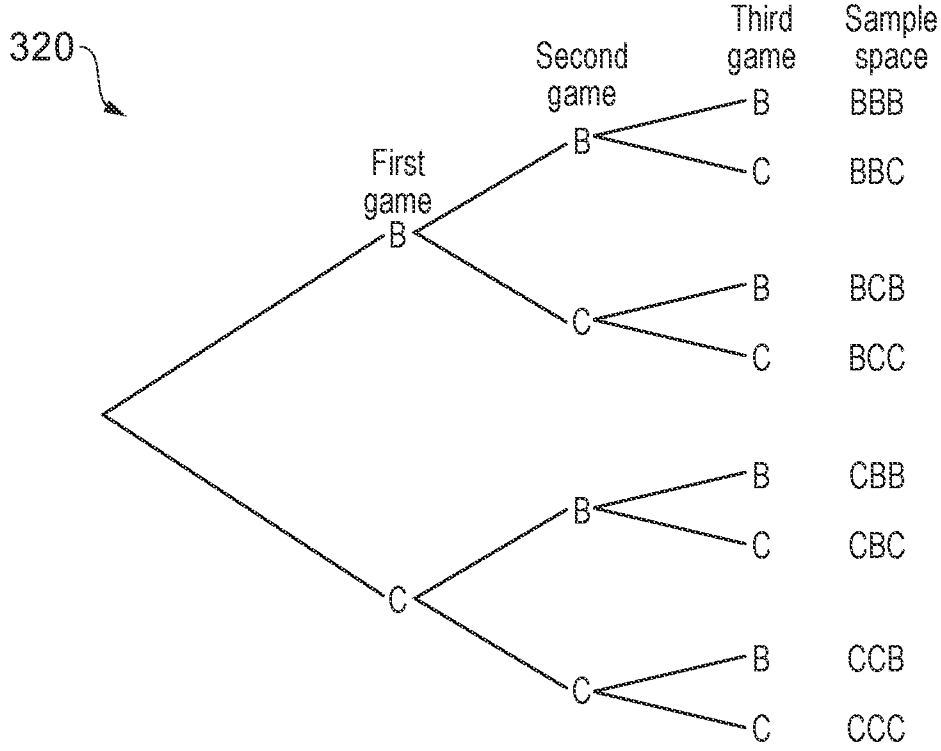
FIG. 8 describes the set level probability model in FIG. 3 according to embodiments of the disclosure.

FIG. 8 illustrates the set level probability model 320 in FIG. 3 according to embodiments of the disclosure. The set level probability model 320 is constructed based on the tennis game rules for scoring a set. The set level probability model 320 is further built upon the game level probability model 315 described above. Specifically, the probability calculated by the game level probability model 315 at each game level is adopted by the node in the set level probability model 320 corresponding to that game level.

The set level winning probability for a given scenario from the given game state is determined by chaining the probability of the shot event (winning/losing a game) in each node along the path describing the scenario. The probabilities for all scenarios to win the set are then added up from the current game state.

The match level probability model 325 in FIG. 3 according to embodiments of the disclosure is constructed in a similar manner as the set level probability model 320 based on the tennis game rules. The match level probability model 325 is further built upon the set level probability model 320 described above. Specifically, the probability calculated by the set level probability model 320 at each set level is adopted by the node in the match level probability model 325 corresponding to that set level.

The match level winning probability for a given scenario from the given game state is determined by chaining the probability of the set event (winning/losing a set) in each node along the path describing the scenario. The probabilities for all scenarios to win the set are then added up from the current game state.

Figure 9:
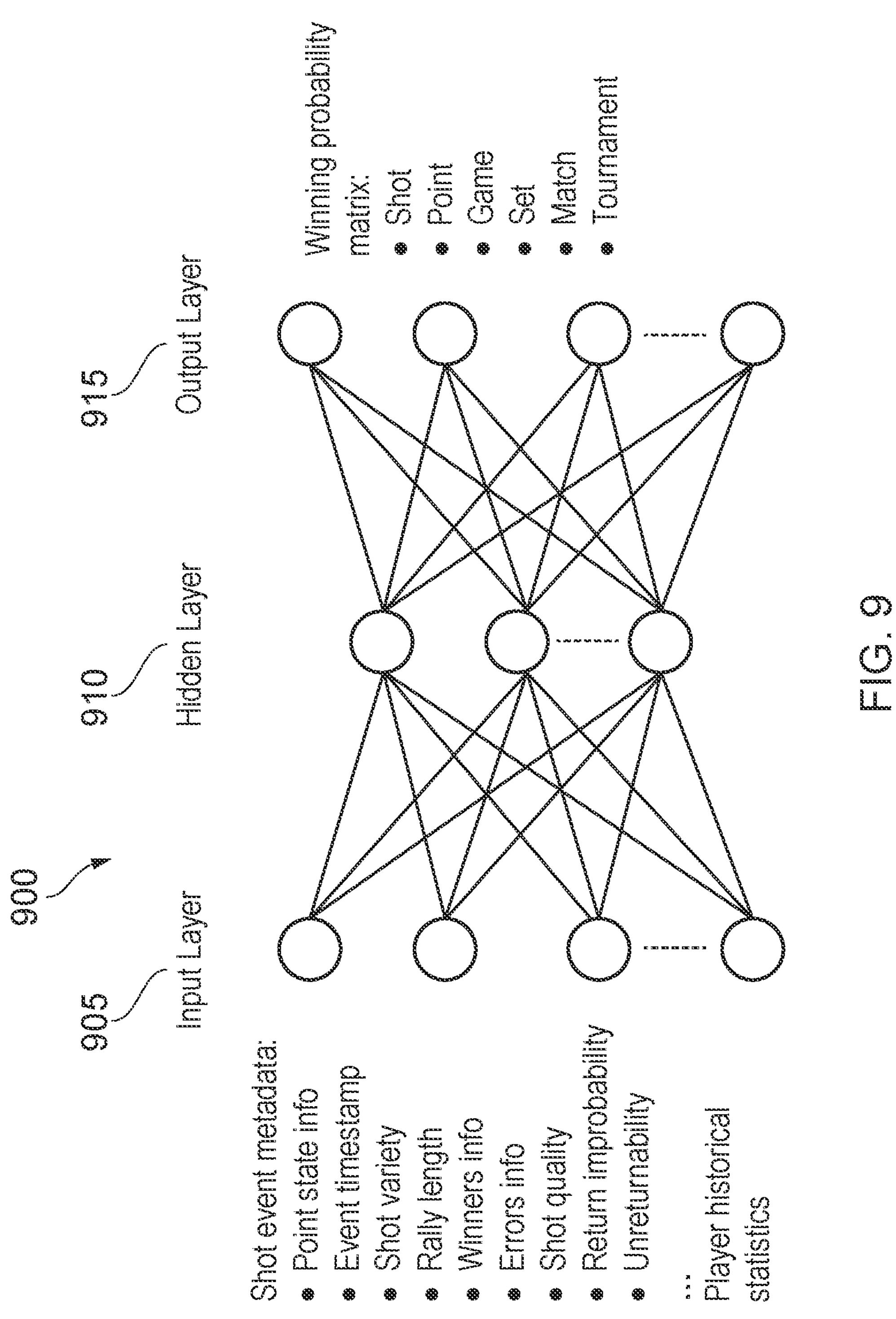
FIG. 9 describes a neural network for winning probability model according to embodiments of the disclosure.

FIG. 9 illustrates an exemplary neural network 900 of the winning probability model according to embodiments of the disclosure. In embodiments, the neural network 900 comprises an input layer of nodes 905, a hidden layer of nodes 910 and an output layer of nodes 915. Although one hidden layer is shown in FIG. 9, it is envisaged that the neural network may include a number of hidden layers. The shot event metadata and player historical statistics as described in FIG. 1 is fed into neural network model 900 as training data set to perform training. Machine learning is implemented by comparing the output at the output layer and a manually calculated winning probability matrix based on the training data set. The parameters of the neural network nodes are then adjusted by machine learning algorithms to align the output at the output layer and the manually calculated winning probability matrix for each training data in the training data set. Once the training has been completed, the video processing system 100 can utilize the neural network model 900 for automatically calculating the winning probability matrix.

Figure 10:
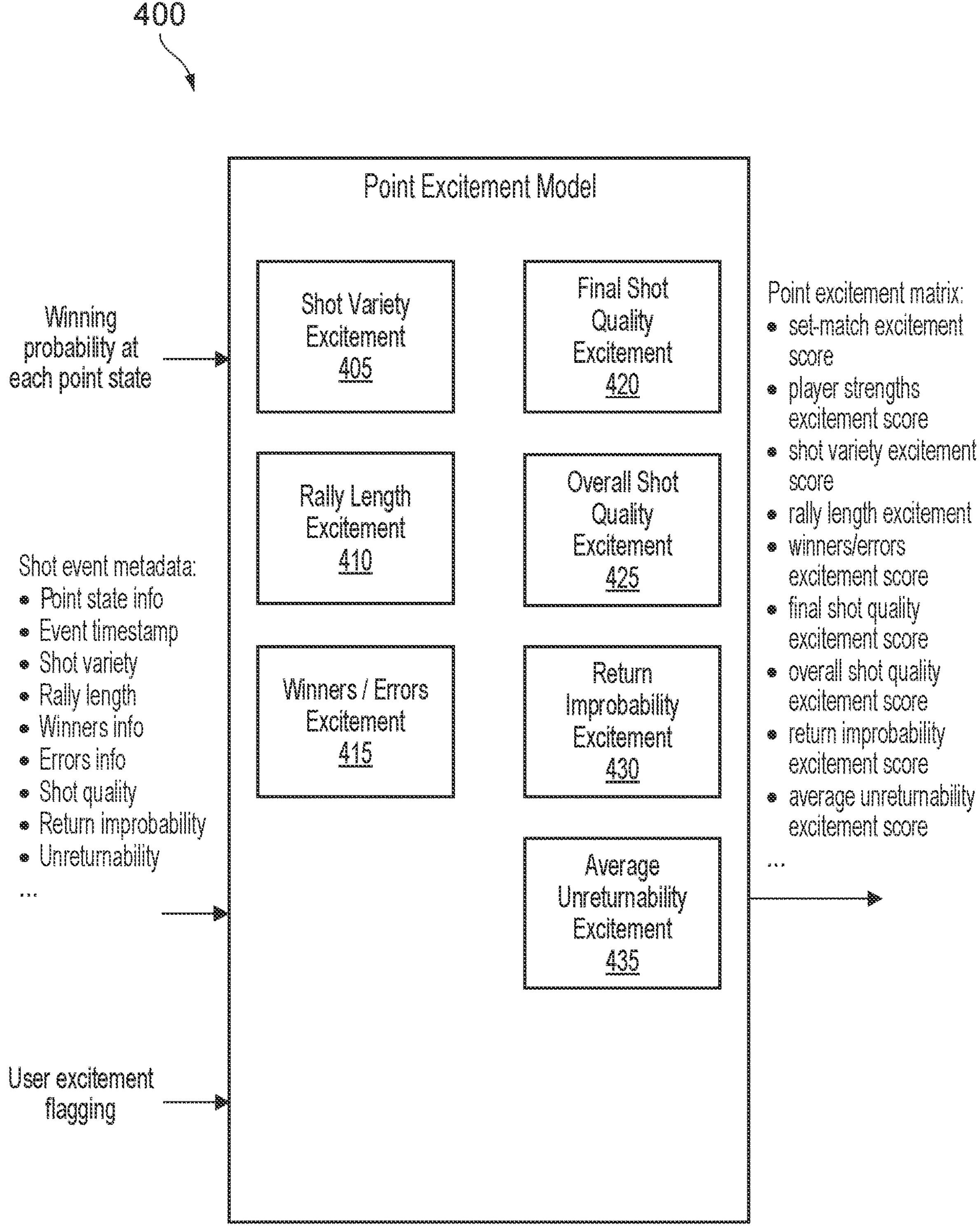
FIG. 10 describes the point excitement model of FIG. 1 according to embodiments of the disclosure.

FIG. 10 is a schematic block diagram illustrating the point excitement model 400 of FIG. 1 according to embodiments of the disclosure. The point excitement model 400 evaluates point excitement matrix based on winning probabilities at each point state provided by the winning probability model 300 and shot event metadata generated by the shot event analyser 200. According to embodiments of the disclosure, the point excitement model 400 comprises a shot variety excitement 405, a rally length excitement module 410, a winners and errors excitement module 415, a final shot quality excitement module 420, an overall shot quality excitement module 425, a return improbability excitement module 430, and an average unreturnability excitement module 435. According to embodiments of the disclosure, the point excitement model 400 may also receive excitement flagging, which the user inserts via a user interface to mark the moments in the sports game video recordings, hence the video segments of sports game events, that he considers exciting or interesting.

According to embodiments of the disclosure, the shot variety excitement module 405 quantifies the excitement of shot by computing a shot variety excitement weight based on the types of shots played. For example, the shot variety excitement weight for a shot increases with the rarity of the shot, and also the likelihood that the shot could be a winner. The shot variety excitement weight may comprise a shot type frequency weighting with respect to frequency of winners. The shot type frequency weighting may be the number of shots for a particular shot type per total number of shots played in a game, or in a recent period of time in the player's career. Alternatively, the shot type frequency weighting may be the complement or reciprocal of the number of shots for a particular shot type per total number of shots played in a game, or in a recent period of time in the player's career.

The shot variety excitement weight may further include a rally-winning frequency factor calculated based on the number of winning rallies per total number of rallies played in a game.

According to embodiments of the disclosure, the shot variety excitement weight may be expressed mathematically as:

$$\text{shot variety excitement score} = \frac{A \times C}{B}$$

where A is the frequency of the shot type, e.g.: one for every 5 rallies

B is the percentage of the shot type among the total number of shots played, e.g.: 10% of non-serve/return shots played C is the percentage of win points when the shot type is played, e.g.: the shot type wins a point 40% of the time when it is played For instances, the shot variety excitement weight of a player for groundstrokes, smash, volley may be 0.72, 1 and 1.69 respectively.

According to embodiments of the disclosure, the rally length excitement module 410 quantifies the excitement of shot by computing a rally length excitement weight based on how many shots are played in a rally. For example, the rally length excitement weight may be calculated by modified log function which is scaled using range of observed values. According to embodiments of the disclosure, the rally length excitement weight may be expressed mathematically as:

$$\text{rally length excitement score} = \log\left(\frac{\text{rally length}}{2}\right) + 1$$

According to embodiments of the disclosure, the winners and errors excitement module 415 quantifies the excitement of shot by evaluating a winners and errors excitement weight according to how exciting a winner, a forced error, or an unforced error is when observed based on the recorded frequency. The winners and errors excitement module 415 may receive the number of winners, forced errors and unforced errors of a player in a game, or in a recent period of time of the player's career, and generate weights from the observed shots using returnability from the winners and errors inference work as multiplier. According to embodiments of the disclosure, the winners and errors excitement weight may be expressed mathematically as:

$$\text{winners excitement score} = \frac{\text{overall average returnability}}{\text{overaaverage returnability}_{winners}}$$

$$\text{forced errors excitement score} = \frac{\text{overall average returnability}}{\text{average returnability}_{forced\ errors}}$$

$$\text{unforced errors excitement score} = \frac{\text{overall average returnability}}{\text{average returnability}_{unforced\ errors}}$$

where $$\text{overall average returnability} = (\text{average returnability}_{winners} \times \text{distribution of outcome}_{winners}) + (\text{average returnability}_{forced\ errors} \times \text{distribution of outcome}_{forced\ errors}) + (\text{average returnability}_{unforced\ errors} \times \text{distribution of outcome}_{unforced\ errors})$$

Table 1 illustrates examples of the numerical values for the calculation of winners and errors excitement weight according to embodiments of the disclosure.

TABLE 1

| | Average returnability | Distribution of outcomes | (Average returnability) × (distribution of outcomes) | Excitement weight |
|---|---|---|---|---|
| Winners | 12% | 34% | 0.0408 | 2.367 |
| Forced errors | 25% | 32% | 0.0800 | 1.136 |
| Unforced errors | 48% | 34% | 0.1632 | 0.592 |
| Overall average returnability | | | 0.2840 | |

According to embodiments of the disclosure, the final shot quality excitement module 420 quantifies the excitement of a shot by evaluating a final shot quality excitement weight based on how exciting the last shot of a rally was. For example, the final shot quality excitement module 420 may multiply the unreturnability value of a final shot with the excitement weight from winners and errors excitement module 420 depending on the type of the final shot as a winner, a forced error or an unforced error. Accordingly, a complex shot which is a winner may have a higher final shot quality excitement weight. The final shot quality excitement weight may be expressed mathematically as:

$$\text{final shot quality excitement score} = \text{unreturnability}_{final\ shot} \times \text{winners and errors excitement score}_{final\ shot}$$

According to embodiments of the disclosure, the overall shot quality excitement module 425 quantifies the excitement of shot by evaluating an overall shot quality excitement weight based on how exciting the relevant shot was. The overall shot quality excitement module 425 may take into account the shot event metadata acquired from the shot event analyser 200, including: how good is the placement of the shot, the origin court zone and destination bounce zone.

The overall shot quality excitement weight may further be calculated based on the aggressiveness of the shot, for example, a volley may be regarded as more aggressive than a control type shot such as a drop shot. The overall shot quality excitement module 425 may additionally evaluate the overall shot quality excitement weight based on the computer vision tracking data generated by the computer vision tracking module 110, such as the speed injection from the previous shot and the arc of the shot (e.g.: the flatter the arc the better the shot).

According to embodiments of the disclosure, the overall shot quality excitement module 430 quantifies the excitement of shot by evaluating a return improbability excitement weight based on how exciting a return shot is. In embodiments, the overall shot quality excitement module 430 may calculate the return improbability excitement weight by multiplying the unreturnability value of the incoming shot with the unreturnability value of the return shot. As a result, the return improbability excitement may have a higher value if an incoming shot has a high unreturnability value and meanwhile it is returned at a high unreturnability value. The return improbability excitement weight may be expressed mathematically as:

$$\text{return improbability excitement score} = \text{unreturnability}_{previous\ incoming\ shot} \times \text{unreturnability}_{current\ return\ shot}$$

According to embodiments of the disclosure, the average unreturnability excitement module 435 quantifies the excitement of shot by evaluating an average unreturnability excitement weight based on how exciting a rally is. In embodiments, the average unreturnability excitement module 435 may calculate the average unreturnability excitement weight by summing up the unreturnability values of all shots within the relevant rally and dividing the sum by the number of shots. For instance, a rally may have a higher average unreturnability excitement weight if the players play higher proportion of unreturnable shots. The average unreturnability excitement weight may be expressed mathematically as:

$$\text{average unreturnability excitement score} = \frac{\sum \text{unreturnability of each shot in a rally}}{\text{total number of shots in a rally}}$$

According to embodiments of the disclosure, the point excitement model 400 outputs a point excitement matrix consisting of the various excitement weight described above. In some embodiments, an overall excitement weight for a certain part of a tournament may be calculated, for example, by averaging the various excitement weights of the shots within that particular portion of the tournament. In some embodiments, the user may set preference on the weighting of the various excitement weight such that the overall excitement weight may be calculated with emphasis on certain desired excitement factors, for example, final shot quality.

According to embodiments of the disclosure, the point excitement model 400 may further calculate the point excitement matrix based on excitement flags added to the timeline of the video recordings by user marking the exciting moments in the sports game. For example, a user may insert a flag for a video segment if he finds the video segment particularly exciting. The point excitement model 400 may then calculate the overall excitement weight by adding the weighting based on the user flagging, in addition to the various excitement weights as described above.

According to embodiments of the disclosure, the point excitement model 400 may further calculate the point excitement matrix based on analysis of commentator reaction in the video recordings. For example, the point excitement model 400 may calculate the overall excitement weight by adding the weighting based on the commentator reaction including the gesture, facial expression, and body movement of the commentator, and the sound level, pitch and transcript of the commentary, in addition to the various excitement weights as described above.

According to embodiments of the disclosure, the point excitement model 400 may further calculate the point excitement matrix based on analysis of spectator reaction in the video recordings. For example, the point excitement model 400 may calculate the overall excitement weight by adding the weighting based on the spectator reaction including the sound level and length of crowd cheering, and the gesture, facial expression, and body movement of the spectators, in addition to the various excitement weights as described above.

According to embodiments of the disclosure, the point excitement model 400 may further calculate the point excitement matrix based on audio analysis of an audio track in the video of the sports game. For example, the point excitement model 400 may calculate the overall excitement weight by adding the weighting based on the sound level and pitch of the commentator audio, spectator audio, or player audio.

FIG. 11 illustrates an exemplary dataset of a point excitement matrix according to embodiments of the disclosure. As previously described, the point excitement matrix may be used as the basis for the video editing module 500 to generate sports game highlight videos.

In embodiments, the point excitement matrix includes video segment serial number, player information, timestamp of the corresponding video segments, scoreboard information, set-match excitement weight, player strengths excitement weight, shot variety excitement weight, rally length excitement, winners/errors excitement weight, final shot quality excitement weight, generic quality excitement weight, return improbability excitement weight, and average unreturnability excitement weight.

Figure 12:
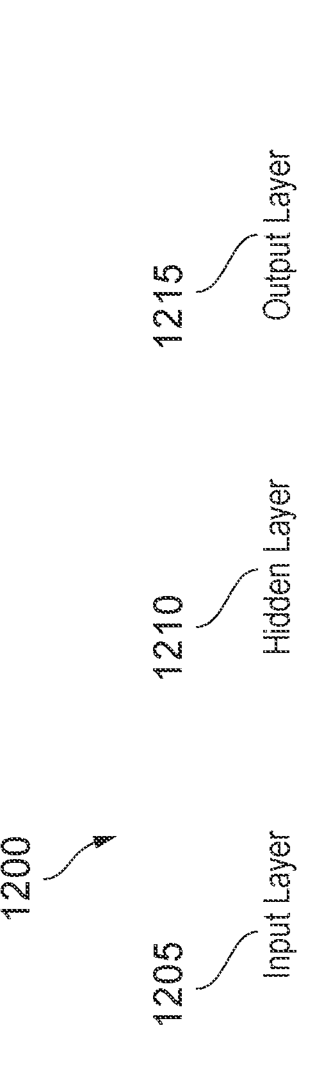
FIG. 12 describes a neural network for point excitement model according to embodiments of the disclosure.
Figure 12:
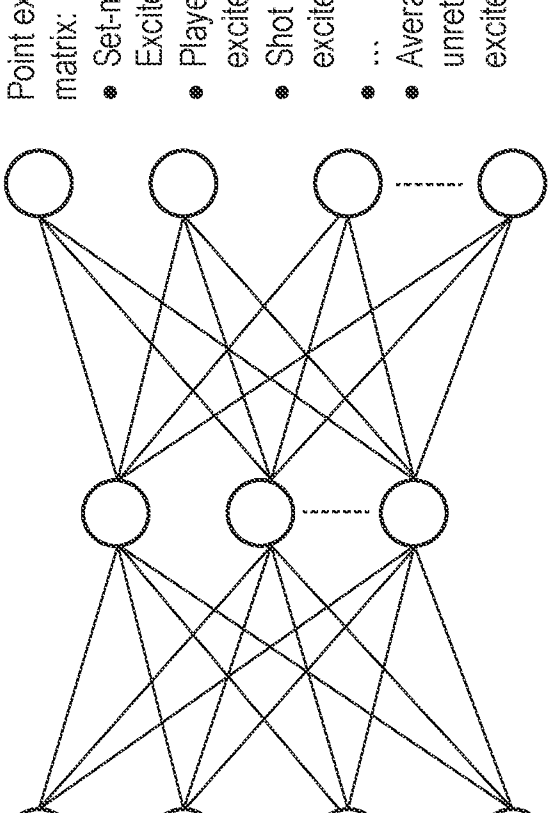

FIG. 12 illustrates an exemplary neural network 1200 of the point excitement model according to embodiments of the disclosure. In embodiments, the neural network 1200 comprises an input layer of nodes 1205, a hidden layer of nodes 1210 and an output layer of nodes 1215. Although one hidden layer is shown in FIG. 12, it is envisaged that the neural network may include a number of hidden layers. The shot event metadata, the winning probability at each point state and user excitement flagging as described in FIG. 10 is fed into neural network model 1200 to perform training. The training data may further include manually evaluated point excitement matrix for conducting supervised training. Once the training has been done, the video processing system 100 can utilize the neural network model 1200 for automatically evaluating the point excitement matrix.

Figure 13:
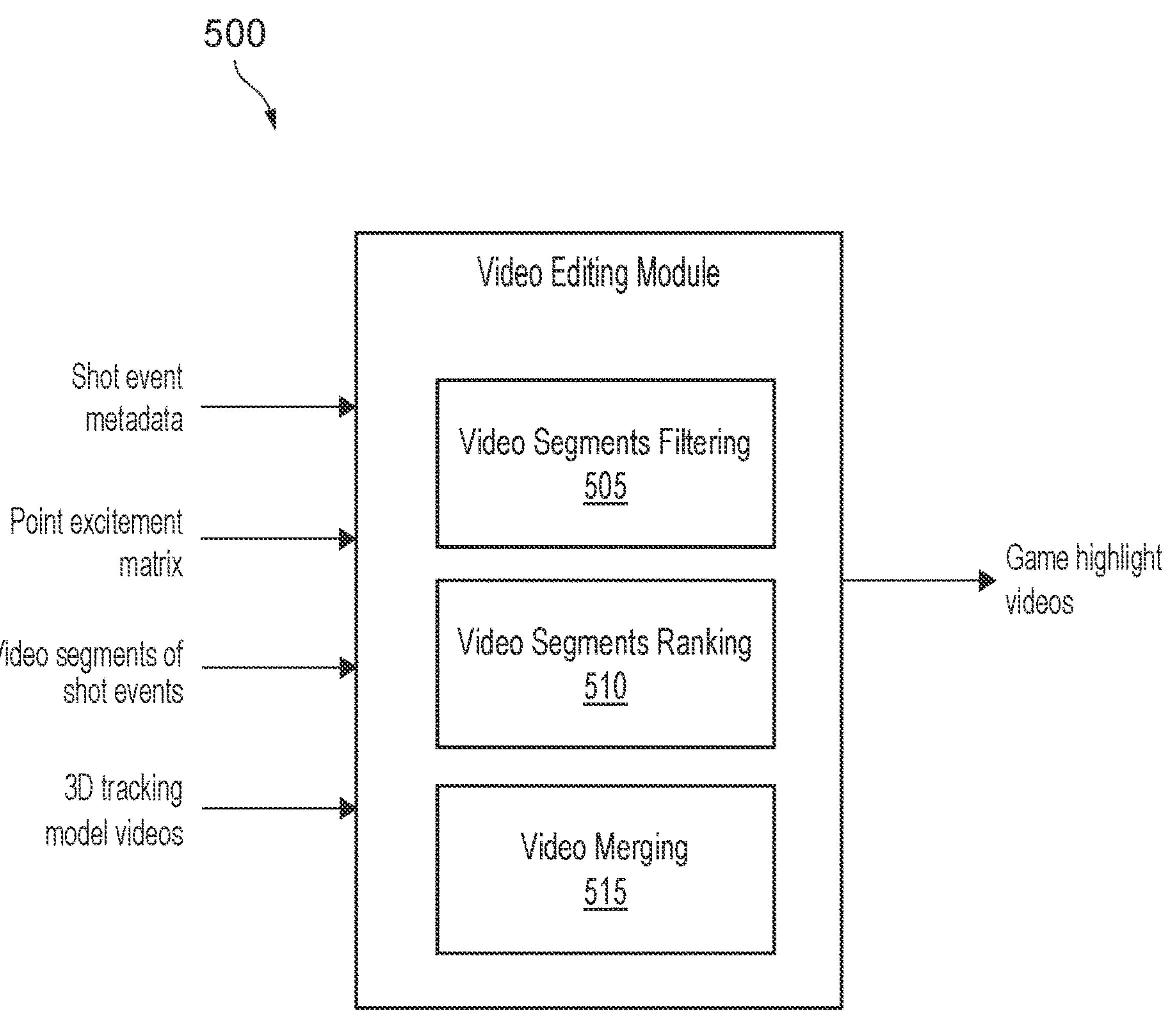
FIG. 13 describes the video editing module of FIG. 1 according to embodiments of the disclosure.

FIG. 13 is a schematic block diagram illustrating the video editing module 500 of FIG. 1 according to embodiments of the disclosure. The video editing module 500 generates highlight videos based on the shot event metadata, point excitement matrix, video segments of shot events and 3D tracking model videos respectively received from the shot event analyser 200, point excitement model 400, shot event analyser 200, and computer vision tracking module 110. According to embodiments of the disclosure, the video editing module 500 may comprise a video segments filtering module 505 and a video segments ranking module 510 which organizes the video segments by filtering and ranking them based on the shot event metadata and point excitement matrix according to priorities and preferences by default or set by the user. By ranking the video segments based on the point excitement matrix, the video segments corresponding to games with more exciting game elements will have a higher priority to be added to the sports game highlight videos. For example, the user may set the filtering criteria as all service aces of a certain player in a tournament, sort the segments according to unreturnability and ball speed, and view the top best played and most exciting service aces.

In some embodiments, the video editing module 500 organizes the video segments based on the shot event metadata and the winning probability matrix. Specifically, video segments are ranked according to the deviations of the actual outcomes of the sports game from the corresponding probabilities in the winning probability matrix. For example, a game played by a player with a low probability of winning the sports game at that game state is considered as surprising and exciting if the player turns out winning the sports game (e.g.: if the winning probability is 0.35 and the outcome is 1 which represents winning, the deviation is 1−0.35=0.65). By ranking the video segments based on the deviations of the actual outcomes from the winning probabilities, the video segments corresponding to the games with more surprising outcome will have a higher priority to be added to the sports game highlight videos.

The video editing module 500 further comprises a video merging module 515 which generates the highlight videos by concatenating the organized video segments and insert the corresponding 3D tracking model videos according to priorities and preferences of game excitement weights by default or set by the user. For instance, the user may set the preference of adding 3D tracking model videos for all faults and outs in the sports game highlight videos. In some embodiments, a 3D tracking model video may be merged with the original sports game video by overlaying as a sub-display (Picture-in-Picture) in the game video segment corresponding to the same shot, to form the sports game highlight video. In some embodiments, a 3D tracking model video may be merged with the original sports game video by adding as full screen display after the game video segment corresponding to the same shot.

FIG. 14 is a flowchart describing a computerized process 1400 for generating sports game highlight video based on winning probability implemented by the video processing system 100 according to embodiments of the disclosure. Process 1400 begins at step 1405, where the video processing system 100 receives video of the sports game from at least one image capture device. The image capture devices may be triangulated in order to capture video for object tracking analysis. At step 1410, the video processing system 100 may perform object tracking analysis on the video to generate tracking data providing ball trajectory and player position information.

At step 1415, the video processing system 100 may identify a shot event in the video of the sports game based on the tracking data. At step 1420, the video processing system 100 may extract video segments of the identified shot events from the video of the sports game. At step 1425, the video processing system 100 may generate shot event metadata for indexing the video segments. At step 1430, the video processing system 100 may compute a winning probability matrix comprising winning probabilities at point level by winning probability model of the sports game, based on the shot event metadata. At step 1435, the video processing system 100 may generate a sports game highlight video based on the winning probability matrix.

According to embodiments of the disclosure, the application of the sports game highlight videos generated by the video processing system 100 based on excitement of gameplay may include broadcasting scenarios such as TV broadcasting, live streaming and game reporting of a tournament, in which the sports game highlight videos may provide a summary with respect to a game, a match, or different levels of the tournament.

According to embodiments of the disclosure, the application of the sports game highlight videos generated by the video processing system 100 based on excitement of gameplay may include coaching scenarios such as providing evaluation of game performance, analyses of players for game tactics and strategies, and insights for coaching. In some embodiments, the sports game highlight videos may be used to prepare training materials by capturing the footage of professional players regarding particular skills chosen by the user.

By adopting the embodiments of the disclosure in a video processing system to automatically generate sports game highlight videos based on a point excitement model, the data transmission and storage of video recordings in relation to a tournament can be significantly reduced. The embodiments of the disclosure further provide an efficient method for generating sports game highlight videos in a real-time manner which in the meantime has improved accuracy in representing the most exciting parts of the sports games.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent embodiments of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present technique can generally be described by the following numbered clauses:

1. A method for generating a sports game highlight video based on winning probability, comprising the steps of:
   receiving video of the sports game from at least one image capture device;
   performing object tracking analysis on the video to generate tracking data providing ball trajectory and player position information;
   identifying a shot event in the video of the sports game based on said tracking data;
   extracting video segments of the identified shot events from the video of the sports game;
   generating shot event metadata for indexing the video segments;
   computing a winning probability matrix comprising winning probabilities at point level by winning probability model of the sports game, based on said shot event metadata; and
   generating a sports game highlight video based on said winning probability matrix.
2. The method for generating a sports game highlight video according to clause 1, wherein the step of computing the winning probability matrix comprises performing statistical analysis based on player historical statistics comprising performance statistics of the player.
3. The method for generating a sports game highlight video according to any preceding clause, wherein the step of computing the winning probability matrix comprises evaluating point state information of the sports game, wherein the point state information is obtained from a scoring feed or by analysing the video of the sports game.
4. The method for generating a sports game highlight video according to any preceding clause, wherein the winning probability model comprises a point level probability model for evaluating the winning probabilities at point level.
5. The method for generating a sports game highlight video according to clause 4, wherein the winning probability model further comprises a game level probability model built upon said point level probability model, for evaluating the winning probabilities at game level.
6. The method for generating a sports game highlight video according to clause 5, wherein the winning probability model further comprises a set level probability model built upon said game level probability model, for evaluating the winning probabilities at set level.
7. The method for generating a sports game highlight video according to clause 6, wherein the winning probability model further comprises a match level probability model built upon said set level probability model, for evaluating the winning probabilities at match level.
8. The method for generating a sports game highlight video according to any preceding clause, wherein the step of computing the winning probability matrix comprises using a machine learning algorithm trained by player historical statistics comprising performance statistics of the player.
9. The method for generating a sports game highlight video according to any preceding clause, wherein the step of generating a sports game highlight video further comprises:
   ranking video segments according to deviations of actual outcomes of the sports game from the corresponding winning probabilities in said winning probability matrix; and
   concatenating the ranked video segments.
10. The method for generating a sports game highlight video according to clause 9, wherein the step of generating a sports game highlight video further comprises:
    generating tracking model videos from tracking data; and
    merging video segments with tracking model videos corresponding to the same shot.
11. The method for generating a sports game highlight video according to any preceding clause, wherein the sports game is selected from the group consisting of tennis, badminton, table tennis, squash and volleyball.
12. A computer program product comprising computer readable instructions which, when loaded onto a computer, configure the computer to perform a method according to any preceding clause.
13. An apparatus for generating a sports game highlight video, comprising circuitry configured to:

receive video of the sports game from at least one image capture device;

perform object tracking analysis on the video to generate tracking data providing ball trajectory and player position information;

identify a shot event in the video of the sports game based on said tracking data;

extract video segments of the identified shot events from the video of the sports game;

generate shot event metadata for indexing the video segments;

compute a winning probability matrix comprising winning probabilities at point level by winning probability model of the sports game, based on said shot event metadata; and generate a sports game highlight video based on said winning probability matrix.

14. The apparatus for generating a sports game highlight video according to clause 13, wherein the circuitry is further configured so that the step of computing the winning probability matrix comprises performing statistical analysis based on player historical statistics comprising performance statistics of the player.

15. The apparatus for generating a sports game highlight video according to any of clauses 13-14, wherein the circuitry is further configured so that the step of computing the winning probability matrix comprises evaluating point state information of the sports game, wherein the point state information is obtained from a scoring feed or by analysing the video of the sports game.

16. The apparatus for generating a sports game highlight video according to any of clauses 13-15, wherein the winning probability model comprises a point level probability model for evaluating the winning probabilities at point level.

17. The apparatus for generating a sports game highlight video according to clause 16, wherein the winning probability model further comprises a game level probability model built upon said point level probability model, for evaluating the winning probabilities at game level.

18. The apparatus for generating a sports game highlight video according to clause 17, wherein the winning probability model further comprises a set level probability model built upon said game level probability model, for evaluating the winning probabilities at set level.

19. The apparatus for generating a sports game highlight video according to clause 18, wherein the winning probability model further comprises a match level probability model built upon said set level probability model, for evaluating the winning probabilities at match level.

20. The apparatus for generating a sports game highlight video according to any of clauses 13-19, wherein the circuitry is further configured so that the step of computing the winning probability matrix comprises using a machine learning algorithm trained by player historical statistics comprising performance statistics of the player.

21. The apparatus for generating a sports game highlight video according to any of clauses 13-20, wherein the circuitry is further configured so that the step of generating a sports game highlight video comprises:

ranking video segments according to deviations of actual outcomes of the sports game from the corresponding winning probabilities in said winning probability matrix; and concatenating the ranked video segments.

22. The apparatus for generating a sports game highlight video according to clause 21, wherein the circuitry is further configured so that the step of generating a sports game highlight video further comprises:

generating tracking model videos from tracking data; and merging video segments with tracking model videos corresponding to the same shot.

23. The apparatus for generating a sports game highlight video according to any of clauses 13-22, wherein the sports game is selected from the group consisting of tennis, badminton, table tennis, squash and volleyball.

What is claimed is:

1. A method for generating a sports game highlight video based on winning probability, comprising the steps of:

receiving video of the sports game from at least one image capture device;

performing object tracking analysis on the video to generate tracking data providing ball trajectory and player position information;

identifying a plurality of shot events in the video of the sports game based on said tracking data, wherein each shot event represents a different stage of a shot, and the shot events correspond to one or more of a tennis ball being hit by a first player, the tennis ball passing a net, the tennis ball landing on a court, and the tennis ball being hit by a second player;

extracting video segments of the identified shot events from the video of the sports game;

generating shot event metadata for indexing the video segments;

computing a winning probability matrix comprising winning probabilities at point level by a winning probability model of the sports game, based on said shot event metadata;

computing a point excitement matrix based on said shot event metadata, wherein the point excitement matrix comprises one or more excitement weights pertaining to one or more of shot variety, final shot quality, rally length, overall shot quality, winners and errors, return improbability, or average unreturnability occurring within a rally; and generating a sports game highlight video based on said winning probability matrix and point excitement matrix, wherein the step of generating a sports game highlight video further includes:

ranking video segments according to deviations of actual outcomes of the sports game from the corresponding winning probabilities in said winning probability matrix, concatenating the ranked video segments, generating tracking model videos from the tracking data so that the tracking model video includes visual presentations of the tracking data, and merging video segments with tracking model videos corresponding to the same shot.

2. The method for generating a sports game highlight video according to claim 1, wherein the step of computing the winning probability matrix comprises performing statistical analysis based on player historical statistics comprising performance statistics of the player.

3. The method for generating a sports game highlight video according to claim 1, wherein the step of computing the winning probability matrix comprises evaluating point state information of the sports game, wherein the point state information is obtained from a scoring feed or by analyzing the video of the sports game.

4. The method for generating a sports game highlight video according to claim 1, wherein the winning probability model comprises a point level probability model for evaluating the winning probabilities at point level.

5. The method for generating a sports game highlight video according to claim 4, wherein the winning probability model further comprises at least one of a game level probability model built upon said point level probability model, for evaluating the winning probabilities at game level, a set level probability model built upon said game level probability model, for evaluating the winning probabilities at set level, or a match level probability model built upon said set level probability model, for evaluating the winning probabilities at match level.

6. The method for generating a sports game highlight video according to claim 1, wherein the step of computing the winning probability matrix comprises using a machine learning algorithm trained by player historical statistics comprising performance statistics of the player.

7. The method for generating a sports game highlight video according to claim 1, wherein the step of generating a sports game highlight video further comprises:

generating tracking model videos from tracking data; and merging video segments with tracking model videos corresponding to the same shot.

8. The method for generating a sports game highlight video according to claim 1, wherein the sports game is selected from the group consisting of tennis, badminton, table tennis, squash and volleyball.

9. A computer program product comprising computer readable instructions which, when loaded onto a computer, configure the computer to perform a method according to claim 1.

10. An apparatus for generating a sports game highlight video, comprising circuitry configured to:

receive video of the sports game from at least one image capture device;

perform object tracking analysis on the video to generate tracking data providing ball trajectory and player position information;

identify a plurality of shot events in the video of the sports game based on said tracking data, wherein each shot event represents a different stage of a shot, and the shot events correspond to one or more of a tennis ball being hit by a first player, the tennis ball passing a net, the tennis ball landing on a court, and the tennis ball being hit by a second player;

extract video segments of the identified shot events from the video of the sports game;

generate shot event metadata for indexing the video segments;

compute a winning probability matrix comprising winning probabilities at point level by a winning probability model of the sports game, based on said shot event metadata;

compute a point excitement matrix based on said shot event metadata, wherein the point excitement matrix comprises one or more excitement weights pertaining to one or more of shot variety, final shot quality, rally length, overall shot quality, winners and errors, return improbability, or average unreturnability occurring within a rally; and generate a sports game highlight video based on said winning probability matrix and point excitement matrix, wherein the step of generating a sports game highlight video further includes:

ranking video segments according to deviations of actual outcomes of the sports game from the corresponding winning probabilities in said winning probability matrix, concatenating the ranked video segments, generating tracking model videos from the tracking data so that the tracking model video includes visual presentations of the tracking data, and merging video segments with tracking model videos corresponding to the same shot.

11. The apparatus for generating a sports game highlight video according to claim 10, wherein the circuitry is further configured so that the step of computing the winning probability matrix comprises performing statistical analysis based on player historical statistics comprising performance statistics of the player.

12. The apparatus for generating a sports game highlight video according to claim 10, wherein the circuitry is further configured so that the step of computing the winning probability matrix comprises evaluating point state information of the sports game, wherein the point state information is obtained from a scoring feed or by analysing the video of the sports game.

13. The apparatus for generating a sports game highlight video according to claim 10, wherein the winning probability model comprises a point level probability model for evaluating the winning probabilities at point level.

14. The apparatus for generating a sports game highlight video according to claim 13, wherein the winning probability model further comprises a game level probability model built upon said point level probability model, for evaluating the winning probabilities at game level.

15. The apparatus for generating a sports game highlight video according to claim 14, wherein the winning probability model further comprises a set level probability model built upon said game level probability model, for evaluating the winning probabilities at set level.

16. The apparatus for generating a sports game highlight video according to claim 15, wherein the winning probability model further comprises a match level probability model built upon said set level probability model, for evaluating the winning probabilities at match level.

17. The apparatus for generating a sports game highlight video according to claim 10, wherein the circuitry is further configured so that the step of computing the winning probability matrix comprises using a machine learning algorithm trained by player historical statistics comprising performance statistics of the player.

* * * * *